UNITED STATES PATENT OFFICE.

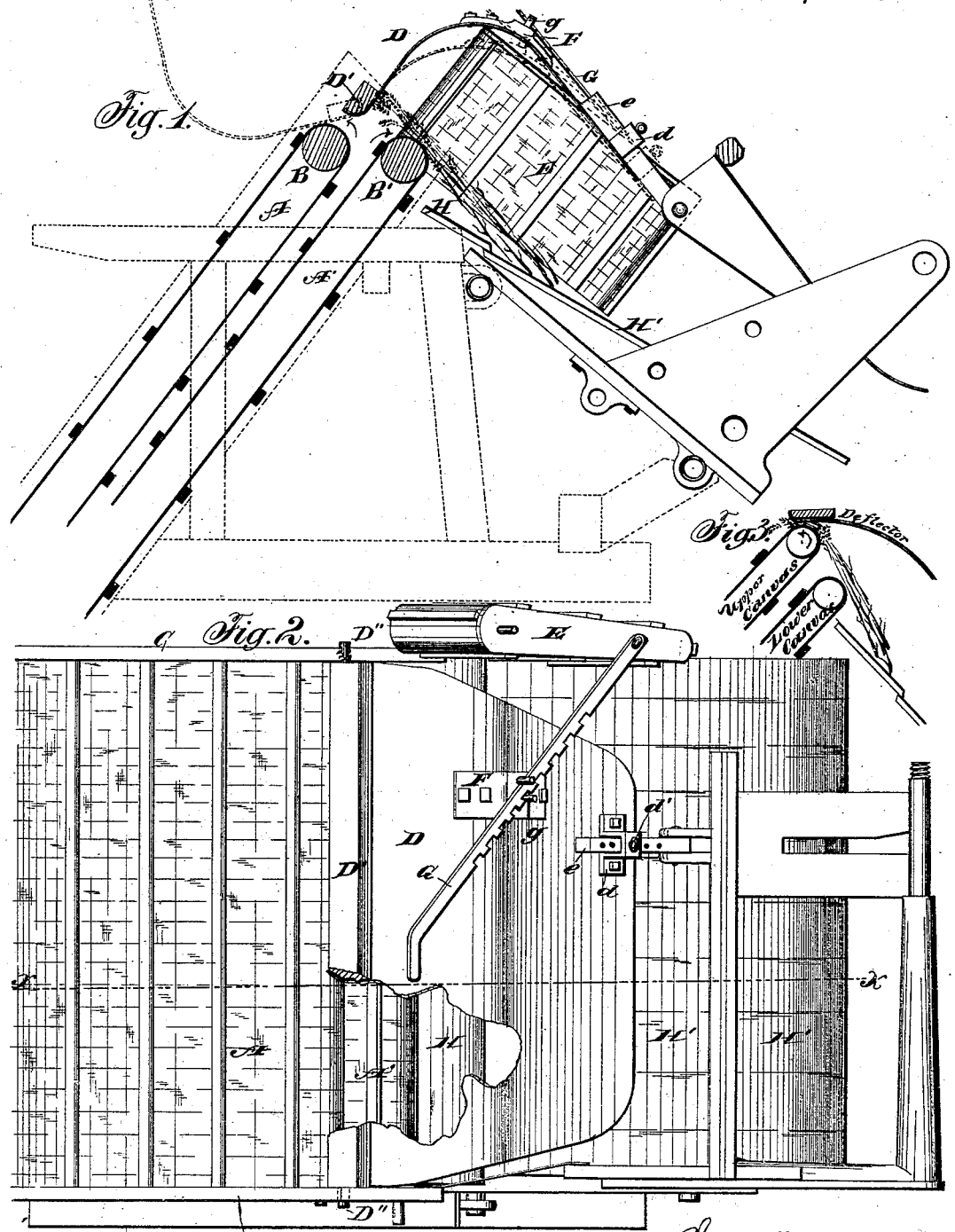

JOHN F. STEWARD AND ROBERT H. DIXON, OF CHICAGO, ILLINOIS.

HARVESTER-BINDER.

SPECIFICATION forming part of Letters Patent No. 314,272, dated March 24, 1885.

Application filed October 22, 1883. (No model.)

*To all whom it may concern:*

Be it known that we, JOHN F. STEWARD and ROBERT H. DIXON, of Chicago, in the county of Cook and State of Illinois, have invented certain new and useful Improvements in Harvester-Binders, of which the following is a full description.

The object of our invention is to make more perfect the delivery of the grain into the binding-receptacle, to make the receptacle accessible by hinging or otherwise making the deflector removable, and to make the position of the deflector adjustable.

Much trouble is experienced with harvesters because of the tendency of the upper elevator-canvas to carry straw through the space between its upper roller and the edge of the deflector. We overcome this difficulty by resorting to a peculiar arrangement of parts, which will be fully pointed out.

Figure 1 is a rear end view of such parts of a self-binding harvester as are necessary to illustrate our invention, as if cut on the line $x\ x$ of Fig. 2. Fig. 2 is a plan view of the same, with part of the deflector broken away. Fig. 3 shows the common way of arranging the delivery end of the elevator-canvases and the deflector, and is introduced to illustrate the defect which we seek to overcome.

A is the upper of the two elevator-canvases, and A' the lower.

B and B' are canvas-driving drums, revolving in suitable bearings in the boards C and C', which form the elevator-frame.

D is the deflector, a broad sheet of iron, with one edge secured to the bar D', and extending upward and over, so as not only to deflect the grain thrown against it by the elevator, but to form a covering for the binder-receptacle. The bar D' has pivots D'' on its ends, which enter holes in the boards C and C', and hence the said bar may be rocked. Near the lower end of the deflector we rivet the piece $d$, and thus form an angular eye, into which the rod or bar $e$, projecting from the binder-frame, may enter. This bar is provided with several holes along its length, and the eye $d$ has a corresponding hole, so that as the said eye is moved to any position on the bar it may be held by the pin $d'$. By this means of adjustment the deflector may be raised or fitted to various positions, two of which are shown in full and dotted lines in Fig. 1.

In operating in what is known as "puffy grain," the deflector must be high to give a large amount of room in the receptacle. The upper extremity of the canvas A is made so low in relation to that of the lower one, A', and the bar D so close to the drum B of the upper canvas, that the space between the said bar and drum shall be not as high as the extremity of the canvas A', when speaking of their comparative length in their direction of motion.

E is the adjusting-canvas, made to swing over the binder-table H H' in the usual manner.

F is a block of wood, fitted upon the crown of the deflector, so as to form a place for engagement of the handle G for adjusting the butting canvas E. The handle G is notched, so as to engage with the pin $g$ on the block F, and that in such a manner that the handle may be disengaged and moved away. Then by removing the pin $d'$ the lower edge of the deflector may be moved so that the eye $d$ will draw off from the bar $e$, when the deflector may be laid over to the position shown in dotted line in Fig. 1, and the receptacle be accessible for cleaning out, tightening the canvas straps, and other purposes.

In the operation of our machine the swath of grain is carried in the usual manner. By the time the straws are thrown in a free state into the receptacle they have passed the space between the bar D' and the upper roller, B, and as the straws fall their heads or butts, as the case may be, cannot be thrown into said space. The straws are in a majority of cases thrown diagonally into the receptacle, and so are left for an instant in the position shown in Fig. 1. When so lying their ends are far from the space referred to.

Calling attention now to Fig. 3, which represents the most common arrangement of elevator-aprons and deflector, it will be seen that when the straws fall diagonally neither the heads nor the butts are obstructed, but are more likely than not when set free to come in contact with the uppermost canvas, or be thrown fairly into the space, and by the slats of the canvas to be drawn through.

What we claim is—

1. The lower elevator-apron, A', in combination with the upper apron, A, shortened at its delivery end in relation to the said apron A' and with the deflector D, its edge placed adjacent to the said apron A, substantially as shown and described, whereby the space between the termination of the apron A and the beginning of the deflector is placed at a point relatively lower than that of termination of the elevating mechanism, as set forth.

2. The combination, with the elevating mechanism, of the deflector D, adjustable in its height, substantially as described.

3. In combination with the harvester-frame and the binder-frame, the grain-deflector and receptacle-covering hinged to the said harvester-frame, and adjustably secured to the binder-frame, whereby the capacity of the receptacle may be varied to conform to varying conditions of grain, or opened at will, substantially as described.

JOHN F. STEWARD.
ROBERT H. DIXON.

Witnesses:
C. L. WADDINGTON,
JOHN B. KASPARI.